United States Patent
Bruemmer et al.

(10) Patent No.: US 12,018,897 B2
(45) Date of Patent: Jun. 25, 2024

(54) HEAT EXCHANGER, FUEL CELL ASSEMBLY AND METHOD

(71) Applicant: MAHLE International GmbH, Stuttgart (DE)

(72) Inventors: Richard Bruemmer, Stuttgart (DE); Christian Buerck, Böblingen (DE); Rainer Lutz, Steinheim (DE); Jan Schultes, Stuttgart (DE); Thomas Strauss, Notzingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/015,957

(22) PCT Filed: Jul. 13, 2021

(86) PCT No.: PCT/EP2021/069439
§ 371 (c)(1),
(2) Date: Jan. 12, 2023

(87) PCT Pub. No.: WO2022/013209
PCT Pub. Date: Jan. 20, 2022

(65) Prior Publication Data
US 2023/0194189 A1    Jun. 22, 2023

(30) Foreign Application Priority Data
Jul. 13, 2020   (DE) .................... 10 2020 208 710.5

(51) Int. Cl.
*F28F 1/02*         (2006.01)
*F28D 1/04*         (2006.01)
(Continued)

(52) U.S. Cl.
CPC ............ *F28F 1/022* (2013.01); *F28D 1/0408* (2013.01); *F28D 3/02* (2013.01); *F28D 3/04* (2013.01);
(Continued)

(58) Field of Classification Search
CPC ...... F28D 1/0408; F28D 1/05366; F28D 3/02; F28D 3/04; F28D 5/02; F28D 21/0012;
(Continued)

(56) References Cited

U.S. PATENT DOCUMENTS

| | | | |
|---|---|---|---|
| 4,274,266 A | 6/1981 | Shires | |
| 5,186,244 A * | 2/1993 | Joshi | F28D 1/0435 165/135 |
| 5,236,045 A * | 8/1993 | Janezich | F28F 1/02 165/182 |
| 5,419,147 A | 5/1995 | Cooper | |
| 6,216,776 B1 * | 4/2001 | Kobayashi | F28F 9/0282 165/110 |

(Continued)

FOREIGN PATENT DOCUMENTS

| | | | | |
|---|---|---|---|---|
| CA | 2556973 A1 | 10/2005 | | |
| DE | 102007031824 A1 * | 3/2008 | ......... | B21C 37/0807 |

(Continued)

OTHER PUBLICATIONS

English abstract for DE-102008006020.

*Primary Examiner* — Eric S Ruppert
*Assistant Examiner* — Hans R Weiland
(74) *Attorney, Agent, or Firm* — Fishman Stewart PLLC

(57) ABSTRACT

A heat exchanger for a fuel cell is disclosed. The heat exchanger includes at least two tube bodies that are arranged at a distance from one another and are in each case structured so that a fluid can flow through internally and so that air can flow around externally. A water channel, through which water can flow fluidically separated from the fluid, is arranged in or on at least one tube body. At least one opening, via which the water channel communicates fluidically with an external environment of the at least one tube body, is provided on the at least one tube body. The at least one opening is arranged in the at least one tube body so that at least one of the tube bodies can be wetter with water, which is guided through the water channel and escapes the water channel through the at least one opening.

21 Claims, 5 Drawing Sheets

(51) Int. Cl.
*F28D 3/02* (2006.01)
*F28D 3/04* (2006.01)
*F28D 21/00* (2006.01)
*F28F 9/02* (2006.01)
*F28F 19/00* (2006.01)
*H01M 8/04007* (2016.01)
*H01M 8/04029* (2016.01)
*F28D 1/053* (2006.01)
*F28D 5/02* (2006.01)

(52) U.S. Cl.
CPC ........ *F28D 21/0012* (2013.01); *F28F 9/0204* (2013.01); *F28F 19/002* (2013.01); *H01M 8/04029* (2013.01); *H01M 8/04074* (2013.01); *F28D 1/05366* (2013.01); *F28D 5/02* (2013.01); *F28D 2021/0043* (2013.01); *Y02E 60/50* (2013.01)

(58) Field of Classification Search
CPC ..... F28D 21/0043; F28F 1/022; F28F 9/0204; F28F 17/00; F28F 17/005; F28F 19/002; F28F 2210/04; F28F 2265/02; F28F 2265/16; H01M 8/04029; H01M 8/04059; H01M 8/04074
See application file for complete search history.

(56) References Cited

U.S. PATENT DOCUMENTS

| | | | | |
|---|---|---|---|---|
| 6,302,195 | B1 * | 10/2001 | Kataoka | F28F 1/003 165/177 |
| 2004/0035559 | A1 * | 2/2004 | Ko | F28F 1/128 165/110 |
| 2008/0289794 | A1 * | 11/2008 | Leitch | F28F 19/01 165/41 |
| 2010/0012307 | A1 * | 1/2010 | Taras | F28F 1/126 165/181 |
| 2013/0206376 | A1 * | 8/2013 | Shikazono | F28D 1/0316 165/172 |
| 2016/0238329 | A1 * | 8/2016 | Utsunomiya | F28F 21/067 |
| 2019/0013530 | A1 * | 1/2019 | Becker | F28D 7/1692 |

FOREIGN PATENT DOCUMENTS

| | | | |
|---|---|---|---|
| DE | 102008006020 A1 | 7/2009 | |
| GB | 2577431 A | 3/2020 | |
| JP | 08170888 A * | 7/1996 | .......... F28D 1/0391 |
| JP | 5756297 B2 | 7/2015 | |
| WO | 9841798 A1 | 9/1998 | |
| WO | 2005091875 A2 | 10/2005 | |
| WO | 2013061170 A1 | 5/2013 | |

* cited by examiner

HEAT EXCHANGER, FUEL CELL ASSEMBLY AND METHOD

CROSS-REFERENCE TO RELATED APPLICATIONS

This application claims priority to International Patent Application No. PCT/EP2021/069439 filed Jul. 13, 2021, which also claims priority to German Patent Application DE 10 2020 208 710.5 filed Jul. 13, 2020, each of which is hereby incorporated by reference in its entirety.

TECHNICAL FIELD

The invention relates to a heat exchanger as well as a fuel cell assembly comprising such a heat exchanger. The invention additionally relates to a method for producing such a heat exchanger.

BACKGROUND

In the case of conventional fuel cells, which is understood hereinafter to be a hydrogen-oxygen fuel cell, hydrogen is oxidized by means of oxygen as oxidizing agent, and a majority of the energy released thereby is tapped in electrical form. Compared to a combustion of the hydrogen by means of oxygen, a comparatively small portion of the energy released during the oxidation is thereby generated as heat. In technical jargon, the oxidation process, which takes place in the fuel cell, is thus often also referred to as "cold combustion". Such fuel cells have been used for some time in motor vehicles in order to supply electrical energy or power, respectively, to an electrical drive train of such a motor vehicle.

During the cold combustion, the hydrogen is oxidized by means of the oxygen into water, which is released by the fuel cell as (by-)product of the cold combustion. This water can be reused for various purposes, thus for controlling the temperature of a heat exchanger or of a temperature control fluid, respectively, which flows through this heat exchanger. However, it often turns out to be technically problematic thereby to realize a guidance of the water in or on the heat exchanger, respectively.

With that in mind, it is an object of the present invention—in particular in order to take into account the above challenge—to show new ways for heat exchangers as well as for fuel cell assemblies comprising such a heat exchanger, and for methods for producing a heat exchanger.

This object is solved by means of the heat exchanger, of the fuel cell assembly, and of the method disclosed herein.

SUMMARY

It is thus the basic idea of the invention to form at least one tube body, through which air can flow, of a heat exchanger comprising a fluid channel, through which a fluid can flow, and comprising a water channel, which is fluidically separated from the fluid channel and through which water can flow. The water channel is thereby formed to be fluidically open to the outside in such a way that at least one of the tube bodies can be wetted externally with water, which is guided through the water channel. The water channel guiding the water can thus advantageously be integrated into the tube body, which makes separate water pipes obsolete. This is reflected in a particularly low mounting effort and, associated therewith, in cost advantages in the production.

A heat exchanger according to the invention, which is advantageously suitable for a use in a fuel cell assembly, has several tube bodies, which are in each case arranged at a distance from one another and which are in each case formed so that a fluid, in particular a liquid or a gas, can flow through internally, and so that air can flow around externally. A water channel, through which water can flow—fluidically separated from the fluid—is thereby arranged in or on at least one tube body. At least one opening, via which the water channel communicates fluidically with the external environment of this tube body, is formed in this at least one tube body. The at least one opening is arranged in the tube body so that at least one of the tube bodies can be wetted with water, which is guided through the water channel and which escapes from the water channel through the opening. At least one of the tube bodies can preferably be sprinkled with water, which is guided through the water channel and which escapes from the water channel through the opening. As already suggested above, the water channel guiding the water can thus advantageously be integrated into at least one of the tube bodies, so that additional water pipes can be saved, which has a positive impact on the mounting effort and the production costs of the heat exchanger. The heat exchanger according to the invention is furthermore of particularly compact construction, which is advantageous in particular in the motor vehicle industry due to the installation space conditions, which are typically extremely tight there.

According to a preferred further development of the heat exchanger, the at least one tube body comprising the water channel comprises a circumferential wall, by means of which a fluid channel, through which the fluid can flow, is fluidically separated from the external environment of the tube body. To form the water channel, this at least one tube body additionally has a separating wall, which fluidically separates the water channel from the fluid channel. The circumferential wall and the separating wall are thereby preferably molded integrally on one another, i.e. formed in one piece and of the same material. This allows for a realization of the at least one tube body in the water channel, which is of particularly compact construction.

In the case of a further advantageous further development of the heat exchanger, it is provided that the tube bodies extend along a direction of extension and are arranged at a distance from one another along a transverse direction running transversely to the direction of extension. The transverse direction preferably corresponds essentially to a direction of gravity in an operating position of the heat exchanger. As a result, an exterior of a tube body, which is adjacent to the tube body comprising the water channel in the transverse direction, in particular arranged below the tube body comprising the water channel in the direction of gravity, can be wetted, in particular sprinkled, with water from the water channel via the opening as a result of the effect of gravity. A particularly efficient heat transfer between the water and the heat exchanger or the fluid, which flows through the heat exchanger, respectively, is advantageously attained therewith.

In the case of a further preferred further development of the heat exchanger, a water channel comprising a corresponding opening of the respective tube body is in each case formed in several, preferably in all, of the tube bodies of the heat exchanger. The at least one opening is thereby preferably formed in the circumferential wall of the respective tube bodies. The wetting or sprinkling, respectively, with the water can thus advantageously take place over a particularly large surface, which increases the efficiency of the heat exchanger between heat exchanger or the fluid and the water flowing through said heat exchanger, respectively.

A further advantageous further development of the heat exchanger provides that the water channel is fluidically open transversely to the direction of extension and along the transverse direction via the opening of the tube body having the water channel. This turns out to be particularly advantageous under fluidic aspects.

In the case of another advantageous further development of the heat exchanger, the at least one opening is formed so as to extend in an interruption-free manner over the entire length of the respective tube body along the direction of extension of the respective tube body. The water channel is thus formed in the manner of an open trough of the respective tube body. Such a water channel impresses due to a good accessibility for maintenance or cleaning purposes, respectively.

According to a further preferred further development of the heat exchanger, the tube body comprising the water channel has several openings, which are open transversely to the direction of extension. These several openings of the respective tube body are arranged at a distance from one another, preferably with respect to the direction of extension and/or the transverse direction, particularly preferably so as to be distributed regularly or irregularly. This allows for a particularly even discharge of the water, which flows through the water channel, via the openings.

A further advantageous further development of the heat exchanger provides that at least one of the tube bodies comprises at least one fluid channel separating wall, which runs internally along the direction of extension and which divides the fluid channel into partial fluid channels, which are fluidically separated from one another and which are preferably connected fluidically in parallel in the heat exchanger. Such a fluid channel separating wall has an advantageous mechanically stiffening effect on the respective tube body and thus also on the entire heat exchanger.

In the case of another preferred further development of the heat exchanger, the heat exchanger comprises a case, which is preferably formed in a housing-like manner and which internally limits a fluid chamber and a water chamber, which are fluidically separated from one another in a case interior of the case by means of a case separating wall as part of the case. The water chamber and the fluid chamber are thereby covered by means of a tube bottom, which has apertures for receiving a respective tube body. The tube bodies are in each case received in one of the apertures of the tube bottom provided for this purpose along the direction of extension at one end in such a way that the water channel is connected to the water chamber, and the fluid channel is connected to the fluid chamber so as to fluidically communicate therewith. The fluid chamber can act as fluid collector for collecting the fluid after flowing through the tube bodies, or as fluid distributor for distributing the fluid to the tube bodies. The water chamber can act as water collector for collecting the water after flowing through the at least one water channel, or as water distributor for distributing the water to the at least one water channel. Individual supply or discharge pipes, which are fluidically connected to the tube bodies or the at least one water channel, respectively, can thus be saved in an advantageous manner.

According to a further advantageous further development of the heat exchanger, the tube body having the water channel has a recess, which is recessed along the direction of extension, on a front side of the tube body, which runs transversely to the direction of extension thereof, between the water channel and the fluid channel. This recess is arranged between two appendages, which are in each case molded on the front side of the tube body in a region of the water channel and in a region of the fluid channel. The tube bottom thereby has a first aperture, via which the water chamber is fluidically open to the outside. The tube bottom further has a second aperture, via which the fluid chamber is fluidically open to the outside. The appendage molded on the front side of the tube body in the region of the water channel is received in the first aperture of the tube bottom, and the appendage molded on the front side of the tube body in the region of the fluid channel is received in the second aperture. The appendages are received in the first or second aperture of the tube bottom, respectively, in such a way that the water channel is connected to the water chamber, and the fluid channel is connected to the fluid chamber fluidically communicating therewith. This allows for a particularly reliable fastening of the tube bodies on the tube bottom.

According to another advantageous further development of the heat exchanger, at least one, preferably each of the apertures of the tube bottom is encased by a passage collar, which is molded integrally on the tube bottom. This passage collar preferably protrudes from the tube bottom, facing the case interior. In the alternative, the passage collar can protrude from the tube bottom, facing away from the case interior. A joining surface between tube bottom and the tube body, which is received in the aperture comprising the passage collar, is advantageously enlarged by means of such a passage collar.

According to an advantageous further development, the heat exchanger has a protective grid comprising bars for protecting the tube body or the tube bodies, respectively, against falling rocks.

The water channel is advantageously arranged between the at least one tube body and the protective grid. This alternative has a particularly compact construction.

The protective grid, in particular at least one bar of the protective grid, partially limits the water channel, preferably together with the tube body. The water channel, which is partially limited by the protective grid, is particularly preferably formed to be open.

According to a further preferred embodiment, the at least one tube body comprising the water channel is connected by means of a substance-to-substance bond to the at least one other tube body, which is formed so that the fluid can flow through. This makes it possible to separately produce the tube body or the water channel, respectively, and to fasten it to the tube body, which forms or limits the fluid channel, respectively, only after the production.

The at least one tube body comprising the water channel can particularly preferably consist of the water channel. In other words, the tube body comprising the water channel serves the purpose of only limiting this water channel, and does not limit a fluid channel, through which the fluid can flow.

The at least one tube body comprising the water channel is advantageously connected to a water collector, which is formed separately from a fluid collector, which is connected to the at least one tube body, through which the fluid can flow. Different embodiments can thus be selected for fluid collector and water collector. A protective grid can in particular be provided on the water collector.

The invention additionally relates to a fuel cell assembly, which is preferably configured for a use in a motor vehicle. The fuel cell assembly comprises a fuel cell, which releases waste water during the operation as a product of cold combustion. The fuel cell assembly additionally comprises a heat exchanger according to the invention according to the above description, the water channel of which can be supplied or is supplied with the waste water released by the fuel cell. The above-described advantages of the heat exchanger according to the invention also transfer to the fuel cell assembly according to the invention comprising such a heat exchanger.

The invention further relates to a method for producing a heat exchanger according to the invention as described above. The method comprises four measures a), b), c), and d). According to measure a), provision of tube bodies takes place, which are formed so that a fluid can flow through internally and so that air can flow around externally. In or on at least one of the tube bodies, a water channel is additionally formed, through which water, in particular waste water of a fuel cell, can flow—fluidically separated from the fluid. Measure b) of the method provides for an arrangement of the tube bodies on a tube bottom, so that the tube bodies are received in apertures, of the tube bottom, which are provided for this purpose. According to measure c), a substance-to-substance joining, in particular soldering or adhesion, of the tube bodies with the tube bottom takes please, so that a fluid-tight joint is created between the tube bodies and an aperture of the tube bottom, which receives the respective tube body. According to measure d), at least one opening of the at least one tube body having the water channel is created. The above-described advantages of the heat exchanger according to the invention transfer analogously also to the method according to the invention for producing such a heat exchanger.

In the case of an advantageous further development of the method, measure d) is performed chronologically prior to measures b) and c). This has the advantage of a simplified creation of the at least one opening because the tube bodies, which are not yet installed, can be handled more easily. In the alternative, measure d) is performed chronologically between measure b) and measure c). This allows for a particularly precise alignment of the at least one opening to a target position of the at least one opening in the completed heat exchanger. In the alternative, measure d) is performed chronologically after measures b) and c). This allows for a particularly secure clamping or fixing, respectively, of the heat exchanger when creating the at least one opening.

In measure d), the at least one opening is advantageously created mechanically, in particular by means of machining and/or punching and/or crimping. A heat input into the material of the tube body is thus kept advantageously low. In the alternative or in addition, the at least one opening is created thermally, in particular by means of a laser in measure d). Such a thermal creation of the at least one opening requires a particularly low manufacturing time.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically

DETAILED DESCRIPTION

Figure 1:
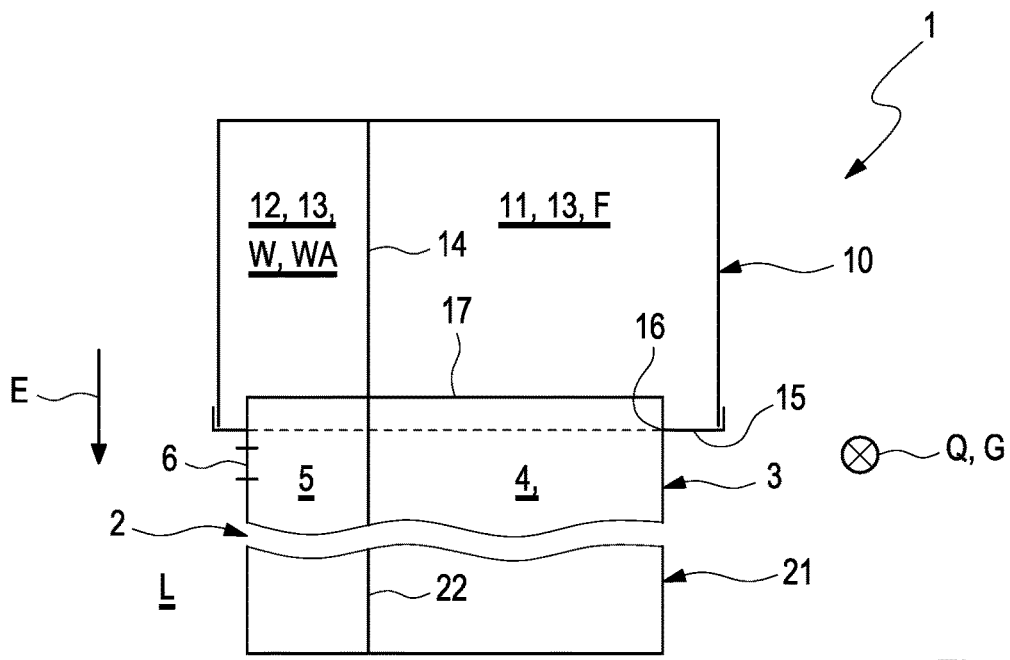
FIG. 1 shows an example of a heat exchanger according to the invention in a section along a direction of extension of tube bodies of the heat exchanger.
Figure 2:
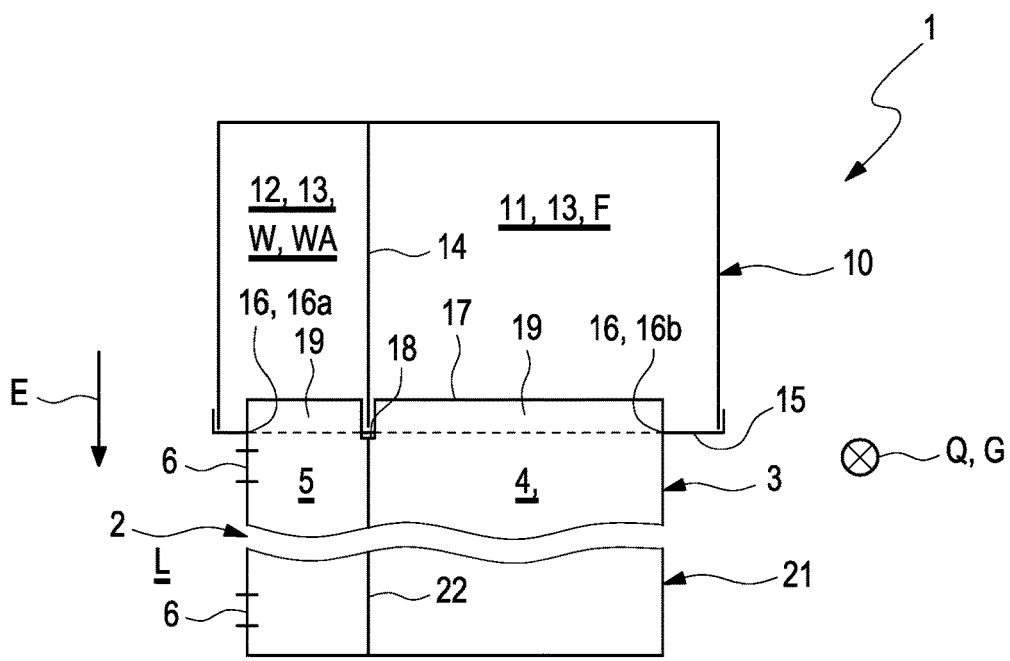
FIG. 2 shows a further example of the heat exchanger according to the invention in a section along the direction of extension of the tube bodies of the heat exchanger.

In FIGS. 1 and 2, an example of a heat exchanger 1 according to the invention is in each case shown in a roughly schematic manner in a section along a direction of extension E, along which tube bodies 2 of the heat exchanger 1 extend. The heat exchanger 1 is configured for a use in a fuel cell assembly according to the invention. The heat exchanger 1 comprises several tube bodies 2, which are in each case arranged at a distance from one another. The tube bodies 2 are in each case formed so that a fluid F can flow through internally, and so that air L can flow around externally. A water channel 5, through which water W can flow—fluidically separated from the fluid F—is arranged in or on at least one of the tube bodies 2. An opening 6 is formed in this at least one tube body 2 comprising the water channel 5. The water channel 5 communicates fluidically with the external environment of the respective tube body 2 via the opening 6. The opening 6 is thereby arranged in the tube body 2 so that at least one of the tube bodies 2 of the heat exchanger 1 can be wetted with the water W, which is guided through the water channel 5 and which escapes through the opening 6. For example, at least one of the tube bodies 2 can be sprinkled with this water W, which escapes from the water channel 5 through the opening 6.

Figure 4:
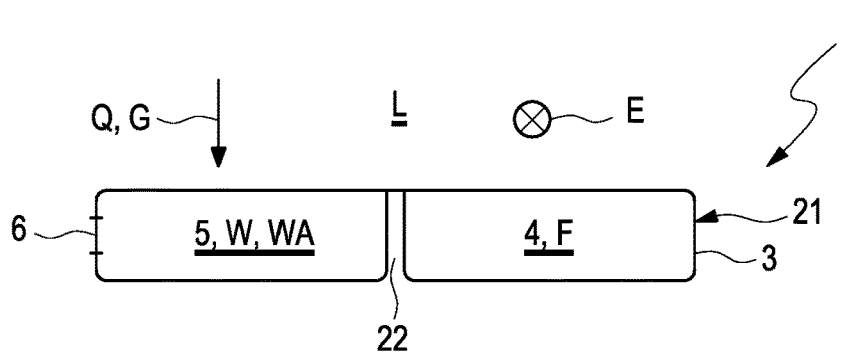
FIGS. 4a to 4c show examples of tube bodies for the heat exchanger according to the invention, in each case in a section transversely to the direction of extension.
Figure 4:
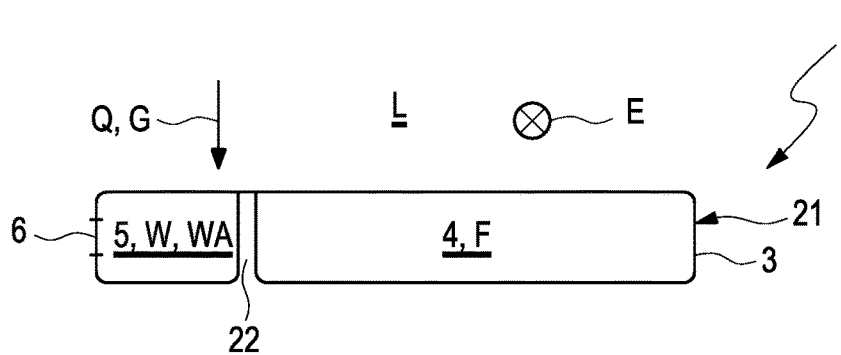
Figure 4:
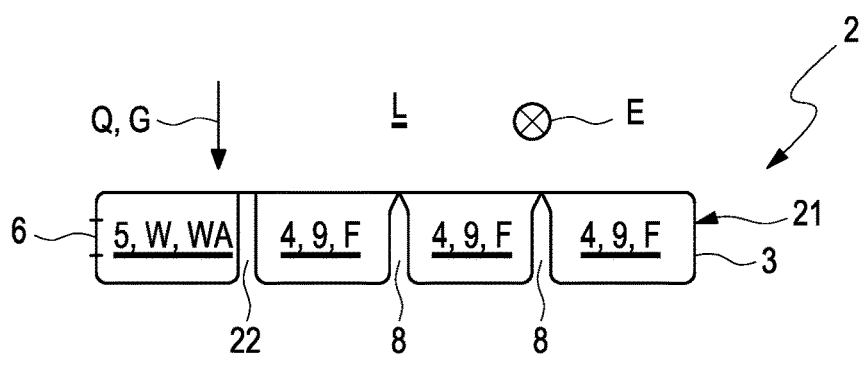

In FIGS. 4a, 4b, and 4c, examples are in each case illustrated in a cut manner on tube bodies 2 for the heat exchanger 1 according to the invention transversely to their direction of extension E. The tube bodies 2 according to these examples are thereby in each case formed as folding tube.

Figure 5:
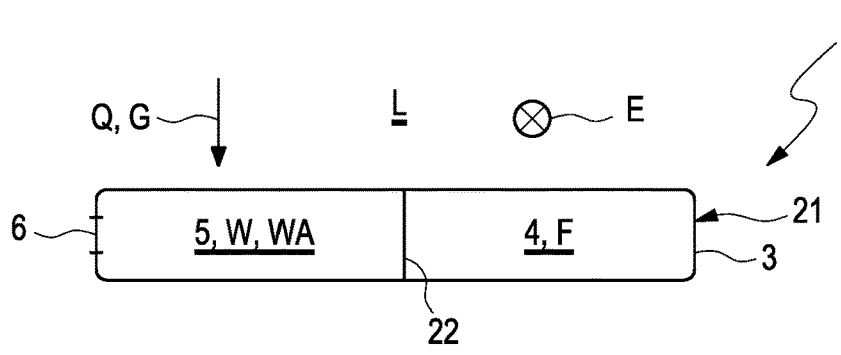
FIGS. 5a to 5c show further examples of tube bodies for the heat exchanger according to the invention, in each case in a section transversely to the direction of extension.
Figure 5:
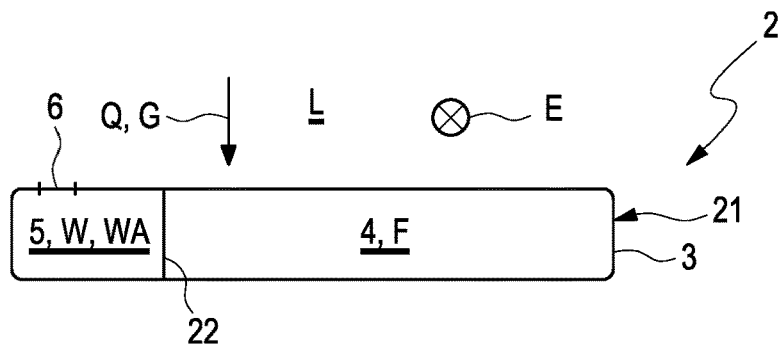
Figure 5:
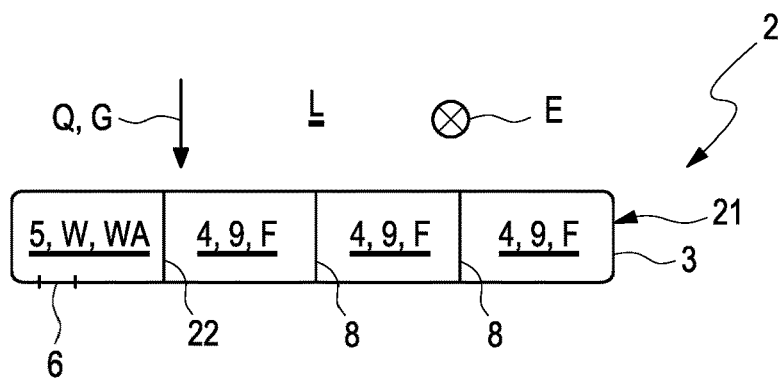

FIGS. 5a, 5b, 5c, as well as 6a and 6b in each case show examples on tube bodies 2 for the heat exchanger 1 according to the invention, cut transversely to their direction of extension E. The tube bodies 2 according to these examples are thereby in each case formed as extrusion tube or welding tube.

It can be gathered from FIGS. 1, 2, 4a, 4b, 4c, 5a, 5b, 5c, as well as 6a and 6b that the tube body 2 comprises a circumferential wall 21, by means of which a fluid channel 4 of the tube body 2, through which the fluid F can flow, is fluidically separated from the external environment of the tube body 2. To form the water channel 5, the at least one tube body 2 comprising the water channel 5 has a separating wall 22. The separating wall 22 fluidically separates the water channel 5 from the fluid channel 4. According to the shown examples, circumferential wall 21 and the separating wall 22 are thereby molded integrally on one another.

In the examples of the heat exchanger 1 of FIGS. 1 and 2, the tube bodies 2 are arranged at a distance from one another along a transverse direction Q, which runs transversely to the direction of extension E. The transverse direction Q corresponds essentially to a direction of gravity G, for example in an operating position of the heat exchanger 1, so that an exterior 3 of a tube body 2, which is adjacent to the tube body 2 comprising the water channel 5 in the transverse direction Q, can be wetted or sprinkled, respectively, with water W from the water channel 5 via the opening 6 as a result of the effect of gravity on the water W.

In the examples of FIGS. 1 and 2, a water channel 5 comprising a corresponding opening 6 of the respective tube body 2 is in each case formed in several tube bodies 2. A water channel 5 comprising a corresponding opening 6 of the respective tube body 2 can be formed in each tube body 2 of the heat exchanger 1. According to the shown examples, the at least one opening 6 is thereby formed in the circumferential wall 21 of the tube body 2 having the water channel 5.

According to the examples of FIGS. 5b and 5c, the water channel 5 is fluidically open transversely to the direction of extension E and along the transverse direction Q via the opening 6 of the tube body 2 having the water channel 5.

Figure 6:
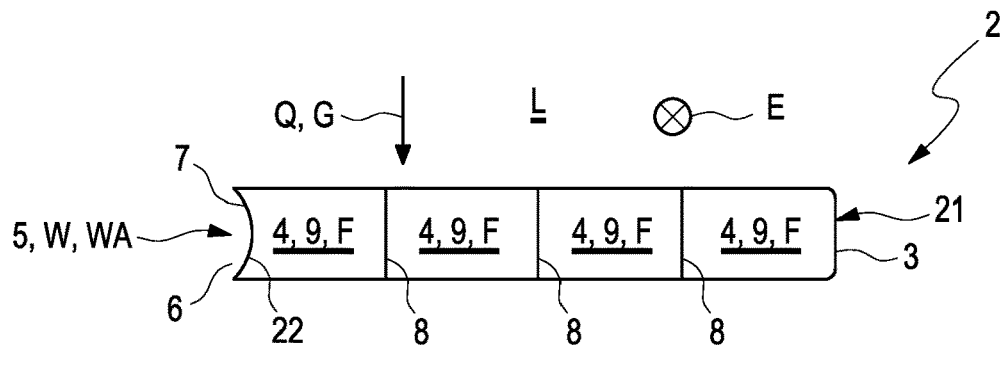
FIGS. 6a and 6b show further examples of tube bodies for the heat exchanger according to the invention, in each case in a section transversely to the direction of extension.
Figure 6:
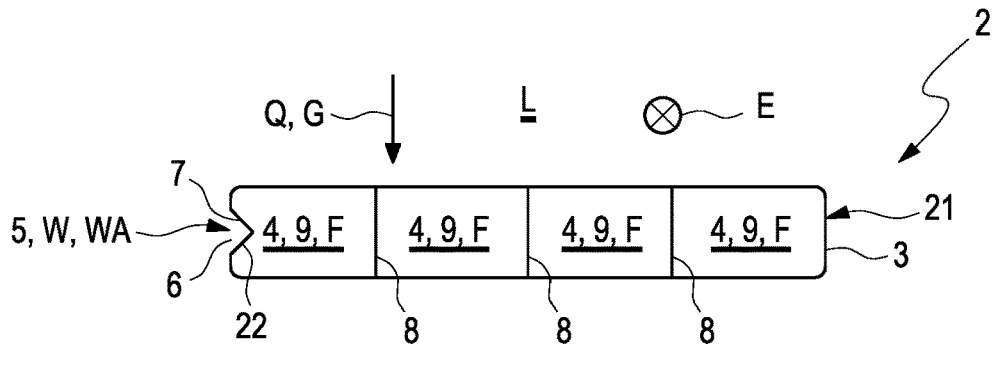

FIGS. 6a and 6b illustrate that in these examples of the tube body 2 for the heat exchanger 1, the opening 6 is formed to extend in an interruption-free manner along the direction of extension E of the tube body 2 having the water channel 5 over the entire length of said tube body. According to these examples, the water channel 5 is thus formed in the manner of an open trough 7 of the respective tube body 2.

FIG. 2 shows that the tube body of the heat exchanger 1 having the water channel 5 has, for example, several openings 6, which are open transversely to the direction of extension E. The several openings 6 of this tube body are thereby arranged at a distance from one another. With respect to the direction of extension E, and, in the alternative or in addition, with respect to the transverse direction Q, the several openings 6 of the tube body 2 can be arranged at a distance from one another. The several openings 6 can thereby be arranged so as to be distributed regularly or irregularly.

FIGS. 4c, 5c, as well as 6a and 6b in each case show that at least one of the tube bodies 2 comprises, for example, a fluid channel separating wall 8, which runs internally along the direction of extension E. The fluid channel separating wall 8 thereby divides the fluid channel 4 into partial fluid channels 9, which are fluidically separated from one another. The partial fluid channels 9 can be connected fluidically in parallel in the heat exchanger 1.

FIGS. 1 and 2 further illustrate that the heat exchanger 1 comprises a case 10, which is formed in a housing-like manner. Internally, the case 10 limits a fluid chamber 11 and a water chamber 12. The fluid chamber 11 and the water chamber 12 are fluidically separated from one another in a case interior 10 of the case 11 by means of a case separating wall 14 of the case 11. The water chamber 12 and the fluid chamber 11 are thereby covered by means of a tube bottom 15 of the heat exchanger 1. The tube bottom 15 has apertures 16 for receiving a respective tube body 2. The apertures 16 can be formed, for example, as passages. The tube bodies 2 are in each case received in one of the apertures 16 of the tube bottom 15 provided for this purpose along the direction of extension E at one end. The tube bodies 2 are thereby received in the apertures 16 in such a way that the water channel 5 of the at least one tube body 2 having the water channel 5 is connected to the water chamber 12, and the fluid channel 4 of the tube bodies 2 is connected to the fluid chamber so as to fluidically communicate therewith.

According to the example of FIG. 2, the tube body 2 comprising the water channel 5 has a recess 18, which is recessed along the direction of extension E, on a front side 17 of the tube body 2, which runs transversely to the direction of extension E thereof. This recess 18 is arranged on the front side 17 of the tube body 2 between the water channel 5 and the fluid channel 4. The recess 18 is arranged between two appendages 19, which are in each case molded on the front side 17 of the tube body 2 in a region of the water channel 5 and in a region of the fluid channel 4. According to the shown example, the tube bottom 15 thereby has a first aperture 16, 16a, via which the water chamber 12 is fluidically open to the outside. The tube bottom additionally has a second aperture 16, 16b, via which the fluid chamber 15 is fluidically open to the outside. In the shown example, the first and the second aperture 16, 16a, 16b are arranged at a distance from one another transversely to the direction of extension E and transversely to the transverse direction Q. It can further be seen that the appendage 19 molded on the front side 17 of the tube body 2 in the region of the water channel 5 is received in the first aperture 16, 16a of the tube bottom 15. The appendage 19 molded on the front side 17 of the tube body 2 in the region of the fluid channel 4 is received in the second aperture 16, 16b of the tube bottom 15. The appendages 19 are thereby received in the first or the second aperture 16, 16a, 16b, respectively, in such a way that the water channel 5 is connected to the water chamber 12, and the fluid channel 4 is connected to the fluid chamber 11 fluidically communicating therewith.

At least one of the apertures 16, 16a, 16b of the tube bottom 15, for example each of these apertures 16, 16a, 16b, is encased by a passage collar, which is molded integrally on the tube bottom 15, but which is not shown in the figures for reasons of clarity. The passage collar can protrude, for example, from the tube bottom 15, facing the case interior 13.

The heat exchanger 1 of FIGS. 1 and 2 can be encased by a fuel cell assembly according to the invention. This fuel cell assembly has a fuel cell, which releases waste water WA during the operation as a product of cold combustion. The water channel 5 of the heat exchanger 1 can or is thereby supplied, respectively, with the waste water WA, which is released by the fuel cell.

Figure 3:
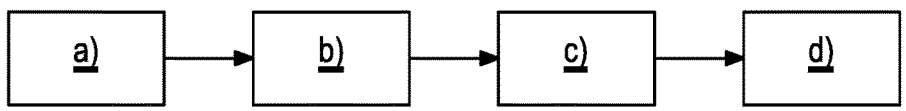
FIG. 3 shows, in an exemplary manner, a flow chart of a method according to the invention for producing a heat exchanger.

In FIG. 3, a method 20 according to the invention for producing a heat exchanger 1 according to the invention, for example the heat exchanger 1 of FIG. 1 or 2, is illustrated by means of a flow chart. It can be seen that the method 20 comprises four measures a), b), c), and d). According to measure a), tube bodies 2 are thereby provided, which are formed so that a fluid F can flow through internally and so that air L can flow around externally. In at least one of these tube bodies 2, a water channel 4 is additionally formed, through which water W, for example waste water WA of a fuel cell, can flow—fluidically separated from the fluid F. Measure b) provides that the tube bodies 2 are arranged on a tube bottom 15 of the heat exchanger 1 to be produced, so that the tube bodies 2 are received in apertures, of the tube bottom 15, which are provided for this purpose. According to measure c), a substance-to-substance joining, for example soldering or adhesion, of the tube bodies 2 with the tube bottom 15 takes please, so that a fluid-tight joint is created between the tube bodies 2 and an aperture 16 of the tube bottom 15, which receives the respective tube body 2. A creation of at least one opening of the at least one tube body 2 having the water channel 5 additionally takes place according to measure d).

According to the example of FIG. 3, measures a) to d) of the method 20 are performed chronologically in the order a)-b)-c)-d). Measure d) is thus performed, for example, chronologically after measures b) and c). In the alternative, measure d) of the method 20 can be performed chronologically prior to measures b) and c) or chronologically between measures b) and c). In measure d), the at least one opening 6 is created mechanically. Such a mechanical creation of the opening 6 can take place by means of machining, punching, or crimping—or a combination thereof. In the alternative or in addition, the creation of the at least one opening 6 according to measure d) can take place thermally, for example by means of a laser.

Various further examples of the heat exchanger 1 according to the invention are shown in FIGS. 7 to 10, in each case cut transversely to the direction of extension E. According to this, the heat exchanger 1 can have a protective grid 24, which has bars 24a. This protective grid 24 can serve to protect the tube body or the tube bodies 2, respectively, against falling rocks. Together with one of the tube bodies 2, one of the bars 24a can in each case limit the water channel 5. The water channel 5 can thus be arranged between the respective tube body 2 and the respective bar 24a, viewed transversely to the direction of extension E and to the transverse direction Q.

According to FIGS. 7 to 10, the respective bar 24a can extend along the direction of extension E. Facing the tube body 2, a bar depression 25 extending along the direction of extension E can thereby be present on the respective bar 24a. It can further be seen that a web 23, which can act as flow guide element, can be present on both sides of the tube body 2 with respect to the transverse direction Q. Several such webs 23 can thereby be arranged at a distance from one another along the direction of extension E on both sides of the tube body 2.

Figure 7:
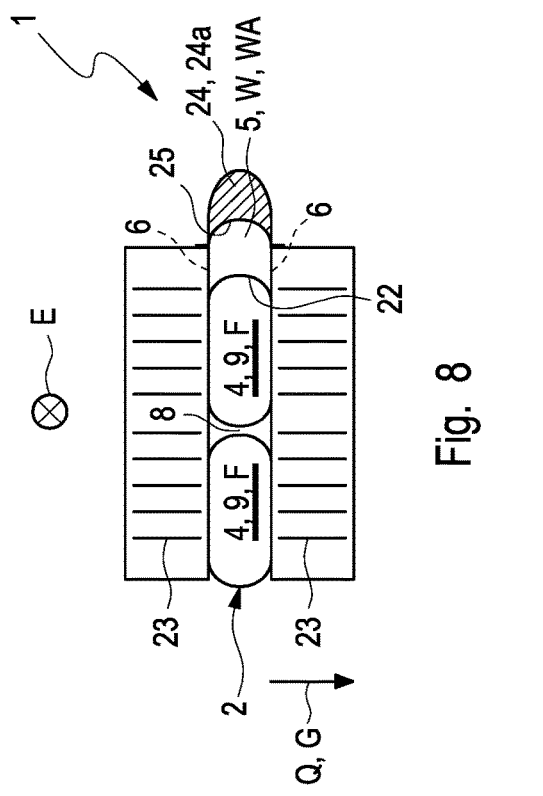
FIGS. 7 to 10 show further examples of heat exchangers according to the invention, in each case in a section transversely to the direction of extension.

FIG. 7 shows that the tube bodies 2 and the webs 23 can be flush with one another transversely to the transverse direction Q and transversely to the direction of extension E. The respective bar 24a of the protective grid 24 can thereby be arranged at a distance from the respective tube body 2 and the webs 23 transversely to the direction of extension E and transversely to the transverse direction Q.

Figure 8:
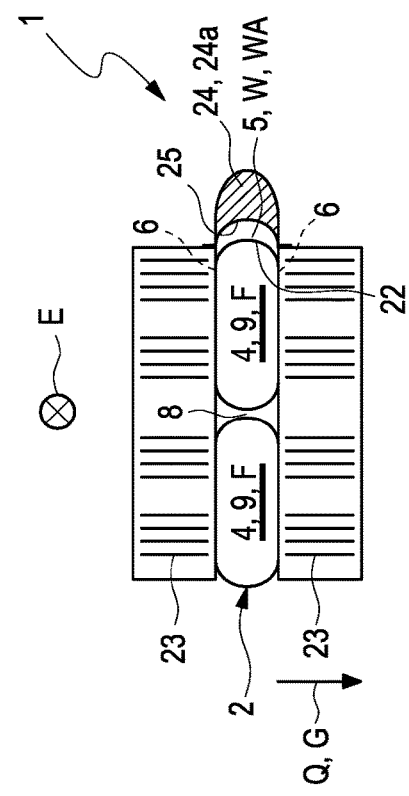

In contrast, it can be gathered from FIG. 8 that the separating wall 22 of the tube body 2 cannot be flush with the webs 23, viewed transversely to the transverse direction Q and transversely to the direction of extension E. On the contrary, the separating wall 22 can be recessed transversely to the transverse direction Q and transversely to the direction of extension E. The respective bar 24a of the protective grid 24 can thereby rest against the webs 23 transversely to the transverse direction Q and transversely to the direction of extension E.

Figure 9:
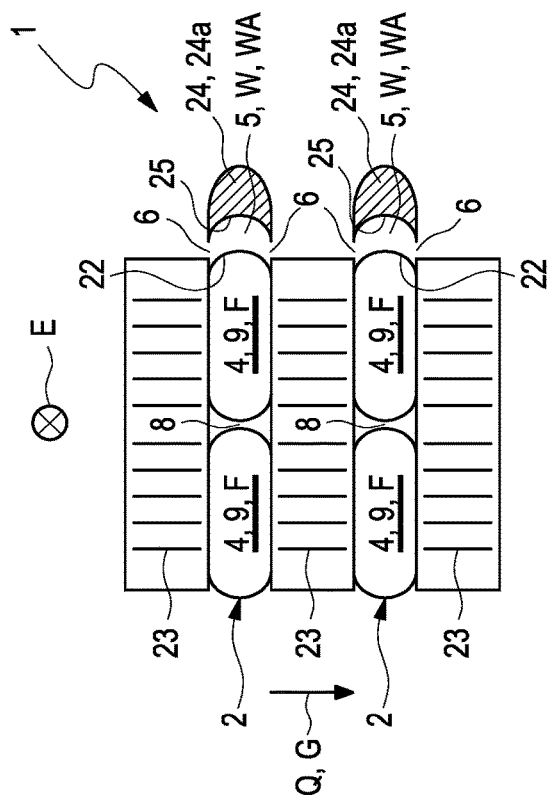

According to the example of FIG. 9 and as also in the example of FIG. 8, the separating wall 22 of the tube body 2 can be recessed inwards, transversely to the transverse direction Q and transversely to the direction of extension E. According to FIG. 9, the respective bar 24a of the protective grid 24 can thereby be arranged between the webs 23, viewed along the transverse direction Q.

Figure 10:
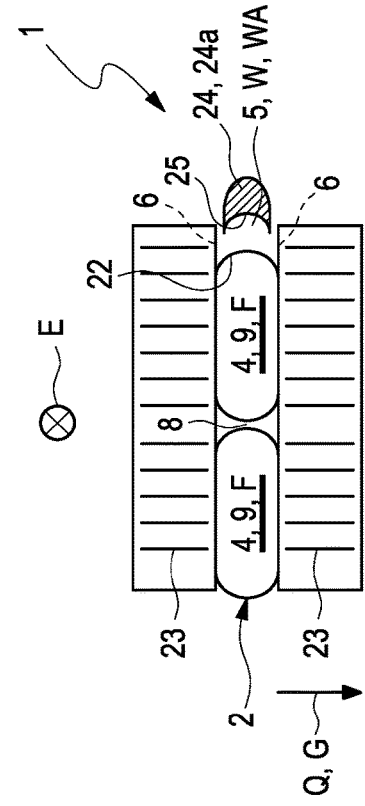

It can additionally be gathered from the example of FIG. 10 that the respective bar 24a of the protective grid 24 can rest against the webs 23 on the outside, transversely to the transverse direction Q and transversely to the direction of extension E.

Figure 11:
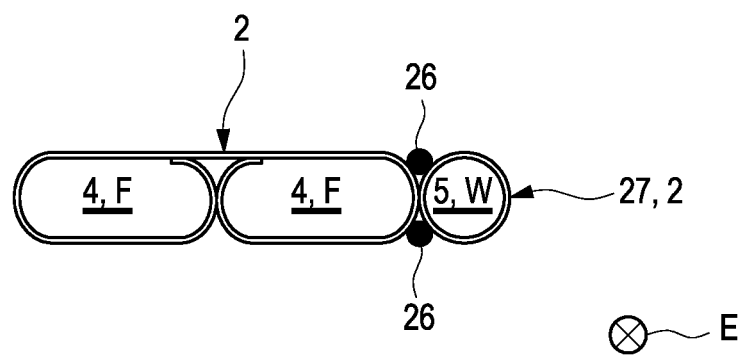
FIGS. 11a, 11b show an alternative of the example of FIG. 1, in which the tube body limiting the water channel is connected by means of a substance-to-substance bond to the tube body limiting two fluid channels as part of the production of the heat exchanger.
Figure 11:
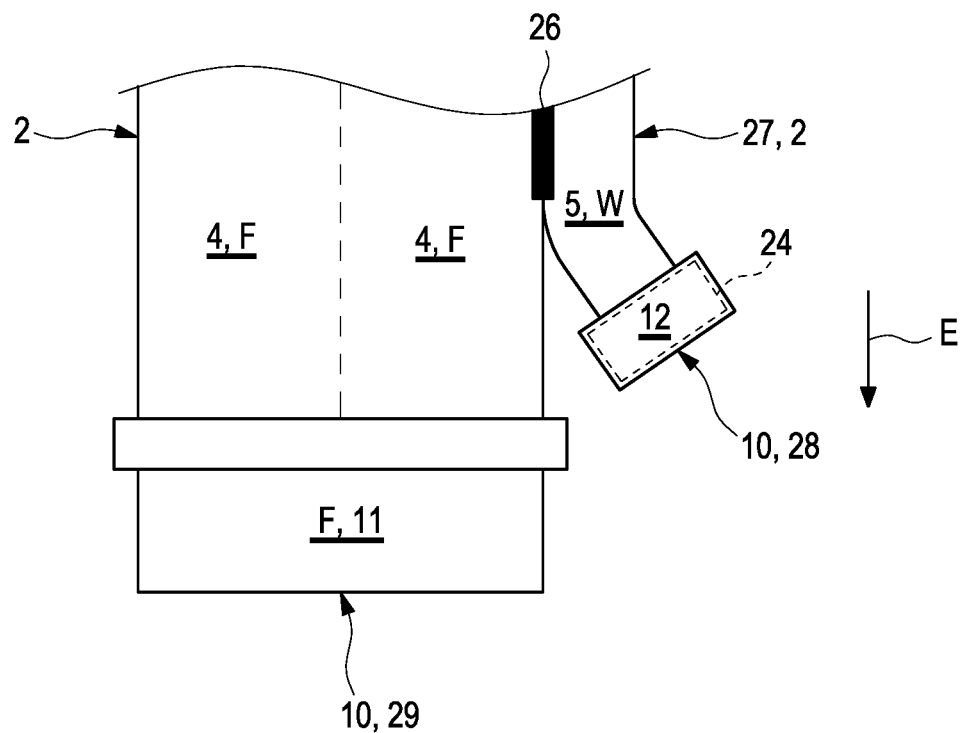

In a sectional illustration, FIG. 11a shows a further alternative, in particular of the example of FIG. 1, in which the tube body 2 comprising the water channel 5 for water W to flow through—this tube body 2 is additionally identified with reference numeral 27 in FIG. 11—is connected by means of a substance-to-substance bond 26—for example by means of an adhesive connection or solder connection or weld connection—to the tube body 2, which limits two fluid channels 4 for the fluid F to flow through in the example scenario. This makes it possible to separately produce the tube body 27 or the water channel 5, respectively, and to fasten it to the tube body 2 or to the fluid channels 4, respectively, only after the production.

FIG. 11b is a top view onto the alternative of FIG. 11a. It can be seen that in the case of the alternative of FIGS. 11a, 11b, two separate cases 10, which are in each case formed in a housing-like manner, are provided for the two fluid channels 4 as well as for the water channel 5—in contrast to the example of FIG. 1. One of the two cases 10, which acts as fluid collector 29 for the fluid F, which flows through the two fluid channels 4, limits the fluid chamber 11 internally. The other one of the two cases 10 limits the water chamber 12 as water collector 28. Individual technical embodiments can thus be used for both cases 10, in particular for the case 10 acting as fluid collector 29. A protective grid 24 can be provided on the water collector 28.

The invention claimed is:

1. A heat exchanger, comprising:
   at least two tube bodies that are arranged at a distance from one another and are in each case structured so that a fluid can flow through internally, and so that air can flow around externally,
   a water channel, through which water can flow fluidically separated from the fluid, arranged in or on at least one tube body of the at least two tube bodies,
   at least one opening, via which the water channel communicates fluidically with an external environment of the at least one tube body, is provided in the at least one tube body,
   wherein the at least one opening is arranged in the at least one tube body so that at least one of the tube bodies can be wetted with water, which is guided through the water channel and escapes from the water channel through the at least one opening, and
   wherein the at least one opening is provided in a circumferential wall of the at least one tube body having the water channel.

2. The heat exchanger according to claim 1, wherein:
   the circumferential wall encloses a fluid channel, through which the fluid can flow, the fluid channel is fluidically separated via the circumferential wall from the external environment of the at least one tube body, and
   the at least one tube body has a separating wall to define the water channel, the separating wall fluidically separates the water channel from the fluid channel.

3. The heat exchanger according to claim 1, wherein:
the at least two tube bodies extend along a direction of extension and are arranged at a distance from one another along a transverse direction running transversely to the direction of extension,
the transverse direction corresponds essentially to a direction of gravity in an operating position, so that an exterior of another tube body that is adjacent to the at least one tube body comprising the water channel in the transverse direction, can be wetted with water from the water channel via the at least one opening as a result of the effect of gravity.

4. The heat exchanger according to claim 1, wherein the at least one opening extends transversely through the circumferential wall of the at least one tube body.

5. The heat exchanger according to claim 1, wherein the water channel is fluidically open transversely to a direction of extension of the at least one tube body and along a transverse direction via the at least one opening of the at least one tube body having the water channel.

6. A fuel cell assembly, comprising:
a fuel cell that releases waste water during operation as a product of cold combustion, and
a heat exchanger, the heat exchanger including:
at least two tube bodies that are arranged at a distance from one another and are in each case structured so that a fluid can flow through internally and so that air can flow around externally;
a water channel, through which water can flow fluidically separated from the fluid, arranged in or on at least one tube body of the at least two tube bodies;
at least one opening, via which the water channel communicates fluidically with an external environment of the at least one tube body, is provided on the at least one tube body;
wherein the at least one opening is arranged in the at least one tube body so that at least one of the tube bodies can be wetted with water, which is guided through the water channel and escapes the water channel through the at least one opening;
wherein the water channel is supplied with the waste water released by the fuel cell.

7. The heat exchanger according to claim 1, wherein:
the at least one tube body having the water channel has several openings that are open transversely to a direction of extension of the at least one tube body, and
wherein the several openings of the at least one tube body are arranged at a distance from one another.

8. The heat exchanger according to claim 1, wherein at least one of the tube bodies comprises at least one fluid channel separating wall that runs internally along a direction of extension of the at least one of the tube bodies and divides the fluid channel into partial fluid channels that are fluidically separated from one another.

9. The heat exchanger according to claim 1, further comprising
a case that internally limits a fluid chamber and a water chamber, the fluid chamber and the water chamber being fluidically separated from one another in a case interior of the case via a case separating wall,
wherein the water chamber and the fluid chamber are covered via a tube bottom that has apertures for receiving a respective tube body of the at least two tube bodies,
wherein the at least two tube bodies are in each case received in one of the apertures of the tube bottom provided along a direction of extension at one end in such a way that the water channel is connected to the water chamber, and the fluid channel is connected to the fluid chamber so as to fluidically communicate therewith.

10. The heat exchanger according to claim 9, wherein:
the at least one tube body having the water channel has a recess that is recessed along the direction of extension, on a front side of the at least one tube body, which runs transversely to the direction of extension thereof, between the water channel and the fluid channel, wherein the recess is arranged between two appendages that are in each case molded on the front side of the at least one tube body in a region of the water channel and in a region of the fluid channel,
wherein the tube bottom has a first aperture of the apertures, via which the water chamber is fluidically open to the outside,
wherein the tube bottom has a second aperture of the apertures, via which the fluid chamber is fluidically open to the outside,
wherein the appendage molded on the front side of the at least one tube body in the region of the water channel is received in the first aperture of the tube bottom, and the appendage molded on the front side of the at least one tube body in the region of the fluid channel is received in the second aperture, so that the water channel is connected to the water chamber, and the fluid channel is connected to the fluid chamber fluidically communicating therewith.

11. The heat exchanger according to claim 9, wherein at least one of the apertures of the tube bottom is encased by a passage collar that is molded integrally on the tube bottom and protrudes from the tube bottom, facing the case interior.

12. The heat exchanger according to claim 1, further comprising a protective grid comprising bars for protecting the at least one tube body against falling rocks.

13. The heat exchanger according to claim 12, wherein the water channel is arranged between the at least one tube body and the protective grid.

14. The heat exchanger according to claim 12, wherein:
the protective grid partially limits the water channel; and
the water channel, which is partially limited by the protective grid, is formed to be open.

15. The heat exchanger according to claim 1, wherein the at least one tube body comprising the water channel is connected via a substance-to-substance bond to the at least one other tube body, through which the fluid can flow.

16. The heat exchanger according to claim 15, wherein the at least one tube body comprising the water channel consists of the water channel.

17. The heat exchanger according to claim 15, wherein the at least one tube body comprising the water channel is connected to a water collector that is provided separately from a fluid collector, which is connected to the at least one tube body, through which the fluid can flow.

18. The fuel cell assembly according to claim 6, wherein the at least one opening is structured and arranged so as to extend in an interruption-free manner over an entire length of the at least one tube body along a direction of extension of the at least one tube body, so that the water channel is structured as an open trough of the at least one tube body.

19. A heat exchanger, comprising:
at least two tube bodies that are arranged at a distance from one another and are in each case structured so that a fluid can flow through internally, and so that air can flow around externally;

a water channel, through which water can flow fluidically separated from the fluid, arranged in or on at least one tube body of the at least two tube bodies;

at least one opening, via which the water channel communicates fluidically with an external environment of the at least one tube body, is provided in the at least one tube body, wherein the at least one opening is arranged in the at least one tube body so that at least one of the tube bodies can be wetted with water, which is guided through the water channel and escapes from the water channel through the at least one opening;

a case that internally limits a fluid chamber and a water chamber, the fluid chamber and the water chamber being fluidically separated from one another in a case interior of the case via a case separating wall;

wherein the water chamber and the fluid chamber are covered via a tube bottom that has apertures for receiving a respective tube body of the at least two tube bodies, wherein the at least two tube bodies are in each case received in one of the apertures of the tube bottom provided along a direction of extension at one end in such a way that the water channel is connected to the water chamber, and the fluid channel is connected to the fluid chamber so as to fluidically communicate therewith.

20. The heat exchanger according to claim 19, wherein: the at least one tube body having the water channel has a recess that is recessed along the direction of extension, on a front side of the at least one tube body, which runs transversely to the direction of extension thereof, between the water channel and the fluid channel, wherein the recess is arranged between two appendages that are in each case molded on the front side of the at least one tube body in a region of the water channel and in a region of the fluid channel, the tube bottom has a first aperture of the apertures, via which the water chamber is fluidically open to the outside, the tube bottom has a second aperture of the apertures, via which the fluid chamber is fluidically open to the outside, the appendage molded on the front side of the at least one tube body in the region of the water channel is received in the first aperture of the tube bottom, and the appendage molded on the front side of the at least one tube body in the region of the fluid channel is received in the second aperture, so that the water channel is connected to the water chamber, and the fluid channel is connected to the fluid chamber fluidically communicating therewith.

21. The heat exchanger according to claim 19, wherein at least one of the apertures of the tube bottom is encased by a passage collar that is molded integrally on the tube bottom and protrudes from the tube bottom, facing the case interior.

\* \* \* \* \*